(12) United States Patent
Sellin et al.

(10) Patent No.: US 10,525,633 B2
(45) Date of Patent: Jan. 7, 2020

(54) METHOD FOR BONDING A COVER MATERIAL TO A SHAPED ARTICLE

(71) Applicant: TESA SE, Norderstedt (DE)

(72) Inventors: Jannik Sellin, Hamburg (DE); Thomas Niemeyer, Lübeck (DE); Esther Von Possel, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/363,528

(22) Filed: Nov. 29, 2016

(65) Prior Publication Data

US 2017/0173858 A1    Jun. 22, 2017

(30) Foreign Application Priority Data

Dec. 22, 2015    (DE) .......................... 10 2015 226 482

(51) Int. Cl.
| | | |
|---|---|---|
| *B29C 65/00* | (2006.01) | |
| *B29C 65/48* | (2006.01) | |
| *B29C 65/02* | (2006.01) | |
| *B29C 65/56* | (2006.01) | |
| *B60R 13/02* | (2006.01) | |
| *B62D 1/06* | (2006.01) | |
| *C09J 5/06* | (2006.01) | |
| *B29C 65/66* | (2006.01) | |
| *B29C 65/70* | (2006.01) | |
| *C09J 5/00* | (2006.01) | |
| *B29L 31/30* | (2006.01) | |

(52) U.S. Cl.
CPC .............. *B29C 65/48* (2013.01); *B29C 65/02* (2013.01); *B29C 65/56* (2013.01); *B60R 13/02* (2013.01); *B62D 1/06* (2013.01); *B29C 65/028* (2013.01); *B29C 65/66* (2013.01); *B29C 65/70* (2013.01); *B29L 2031/3047* (2013.01); *C09J 5/00* (2013.01); *C09J 5/06* (2013.01); *Y10T 156/103* (2015.01); *Y10T 156/1028* (2015.01)

(58) Field of Classification Search
CPC ....... B29C 65/02; B29C 65/028; B29C 65/56; B29C 65/66; B29C 65/70; B06R 13/02; B62D 1/06; C09J 5/00; C09J 5/06; Y10T 156/1028; Y10T 156/103
USPC ...... 156/91, 196, 212, 217, 273.3, 443, 494, 156/499
See application file for complete search history.

(56) References Cited

U.S. PATENT DOCUMENTS

| | | | |
|---|---|---|---|
| 5,863,370 A | 1/1999 | Munro | |
| 6,177,198 B1* | 1/2001 | Schaefer | ................. B32B 27/40 428/212 |
| 6,835,266 B2* | 12/2004 | Alawadi | ............... B29C 51/145 156/152 |
| 2008/0060468 A1* | 3/2008 | Paonessa | ................. B62D 1/04 74/552 |
| 2008/0105077 A1* | 5/2008 | LaBoskey | .............. B21D 53/26 74/558 |
| 2015/0017452 A1 | 1/2015 | Schmitz-Stapela et al. | |

FOREIGN PATENT DOCUMENTS

| | | |
|---|---|---|
| DE | 41 34 951 C1 | 6/1992 |
| DE | 297 09 927 U1 | 8/1997 |
| DE | 0 2009 012 856 A1 | 10/2009 |
| DE | 10 2009 012 956 A1 | 10/2009 |
| WO | 98/26918 A1 | 6/1998 |
| WO | 2013/127697 A | 9/2013 |
| WO | 2017/050603 A1 | 3/2017 |

OTHER PUBLICATIONS

European Office Action issued by the European Patent Office corresponding to EP Application No. 16205697.2.
German Office Action dated Aug. 25, 2016.

* cited by examiner

*Primary Examiner* — Mark A Osele
*Assistant Examiner* — Nickolas R Harm
(74) *Attorney, Agent, or Firm* — Norris McLaughlin, P.A.

(57) ABSTRACT

Method for bonding a sheetlike cover material to a shaped article,
using an adhesive film comprising at least one layer of a heat-activatedly bondable adhesive, where
the adhesive film is disposed, over the full area or a partial area, between the cover material and the shaped article, the heat-activatedly bondable adhesive as yet not adhering to the shaped article,
wherein the cover material is pulled onto the shaped article under tension, so that the layer of the heat-activatedly bondable adhesive contacts the shaped article,
and the activation of the heat-activatedly bondable adhesive is brought about by means of the pressure resulting exclusively from the tension, and optionally of heat introduced by means of external energy supply,
whereby the heat-activatedly bondable adhesive adheres to the shaped article and a durable connection of the cover material to the shaped article is produced.

6 Claims, No Drawings

METHOD FOR BONDING A COVER MATERIAL TO A SHAPED ARTICLE

This application claims foreign priority benefit under 35 U.S.C. § 119 of German Patent Application No. 10 2015 226 482.3, filed Dec. 22, 2015, the disclosure of which are incorporated herein by reference.

The invention relates to a method for bonding a sheetlike cover material to a shaped article, using an adhesive film comprising at least one layer of a heat-activatedly bondable adhesive, where the adhesive film for bonding is arranged, over the full area or a partial area, between the cover material and the shaped article.

BACKGROUND OF THE INVENTION

The production of utility articles often sees a shaped article made from a metal, a plastic, rubber, foam, rigid foam or the like covered with a covering, made for example from a textile material, from leather, synthetic leather, polymeric film or the like. Particularly if such utility articles are exposed to mechanical stresses in the course of their use, a covering of this kind is to be fixed durably and reliably on the shaped article, so that in the course of service it does not slip, lose shape or even fall off again.

Such fixing has hitherto often been carried out using a liquid adhesive. This, however, entails problems such as unclean operations or unclean processing of the finished product by squeezing-out of adhesive, the migration of solvents from the adhesive into the covering or into the shaped article, or the evaporation of substances which are volatile—and frequently harmful to health—such as solvent residues from the adhesive over time. For very reliable adhesive bonds, reactive adhesives are popular among the liquid adhesives, but are hampered by the problem that they may require relatively long reaction times for curing.

In order to ensure very durable and reliable bonds, heat-activatedly bondable adhesives, especially in film form, have proven suitable. These adhesives are customarily non-tacky or of only weak tack at room temperature, but bond when a particular activation temperature is exceeded—especially by thermal melting and/or onset of a curing reaction—and ultimately set on cooling. Heat-activatedly bondable adhesives, however, generally require increased work during the bonding operation, since in addition to the heat that must be introduced externally, the influence of elevated pressure is also necessary in order to ensure an optimum bond. For this reason, bonding takes place customarily in hot presses, thus restricting this bonding method to planar, sheetlike substrates. Furthermore, compressible and heat-sensitive materials are not amenable to such an operation.

SUMMARY OF THE INVENTION

It is an object of the invention, therefore, to open up the operation of bonding with a heat-activatedly bondable adhesive, with simple process effort, to include substrates which according to the hitherto customary processes have not been able to be bonded with them, or for which this bonding operation entails an increased technical effort.

This object can be achieved by means of the method proposed in accordance with the invention. In this method, for bonding a sheetlike cover material to a shaped article, an adhesive film is used which comprises at least one layer of a heat-activatedly bondable adhesive (also referred to synonymously in the literature as "thermoactivatedly bondable adhesive"). In accordance with the invention, first of all, the adhesive film is disposed, over the full area or a partial area, between the cover material and the shaped article, with the heat-activatedly bondable adhesive as yet not bonding, or bonding only very weakly, to the shaped article. The cover material is pulled under tension onto the shaped article in such a way that the layer of the heat-activatedly bondable adhesive, located in between, contacts the shaped article, and the activation of the heat-activatedly bondable adhesive is brought about by means of the pressure resulting from the tension, and of heat introduced optionally by means of external energy supply, so that the heat-activatedly bondable adhesive adheres to the shaped article and a durable connection of the cover material to the shaped article is produced.

DETAILED DESCRIPTION

For the heat-activatedly bondable adhesive as well it is possible to draw on the pool available to the skilled person. These adhesives are selected in particular such that prior to the activation they have insubstantial inherent tack or none, so that after the cover material is pulled onto the shaped article, but before the activation, they as yet do not adhere to the article (or possibly do so only very weakly), meaning that repositioning is possible, in order to correct or make fine adjustments to the disposition of the cover material on the shaped article.

Heat-activatable adhesives can be differentiated into two categories, which can be used to outstanding effect in accordance with the invention:

a) thermoplastic heat-activatable adhesives ("hotmelt adhesives")

b) reactive heat-activatable adhesives ("reactive adhesives")

Thermoplastic heat-activatable adhesives ("hotmelt adhesives") are usually not self-adhesive or are weakly self-adhesive at room temperature. The adhesive only becomes activated with heat, and melts, becomes fluid, and is able to flow onto the substrates to be bonded, becoming self-adhesive at the elevated temperatures. The factor responsible for this is an appropriately high glass transition temperature on the part of the adhesive, and so the activation temperature for achieving sufficient tack lies above room temperature. At the elevated temperatures, a bonding effect occurs even before the adhesive has set, owing to the self-adhesive properties. After joining has taken place, these adhesives set on cooling with solidification physically (generally reversible; thermoplastic materials), optionally also chemically (generally irreversible; thermoplastic-reactive materials), and so in the cooled state as well, the bonding effect is maintained, and it develops its ultimate strength in that state. The greater the heat, pressure and time, the more solid in general becomes the connection of the two materials to be bonded. With such systems it is possible generally to realize maximum assembly strengths and easy processing conditions. Thermoplastics are understood to be those compounds as defined in Römpp (online version; 2008 edition, document code RD-20-01271).

Reactive heat-activatable adhesives ("reactive adhesives") are polymer systems which have functional groups such that on supply of heat there is a chemical reaction, the adhesive sets chemically and in this way the adhesive effect is evoked. Reactive heat-activatable adhesives generally do not become self-adhesive on supply of heat, and so the bonding effect begins only after setting. Reactive heat-activatable adhesives are generally not thermoplastic. The glass transition temperature is not important to the functionality of reactive systems. Equally it may be advantageous to design the reactive adhesives such that they become softer and/or more fluid at elevated temperature, for optimum conformity to the bonded joint.

In the case of a particularly advantageous method regime of the invention, heat-activatedly bondable adhesives used are those whose activation temperature is at a low level. By this means it is possible to bond even heat-sensitive materials without causing them damage. Since, moreover, there is no need for external pressure to be exerted, the bonding possible through the method thus configured is particularly gentle to materials.

As a heat-activatedly bondable adhesive—and one outstandingly suitable in the sense of the layer of the heat-activatedly bondable adhesive for the invention set out in the present specification—with a relatively low activation temperature, it is possible advantageously to use latent adhesives of the kind as described for example in WO 2013/127697 A. These, in the sense of the heat-activatedly bondable layers of adhesive, are, in particular, latent reactive adhesive films of a kind which comprise a) a thermoplastic component having a melting temperature $T_{melt}$ in the range of 35° C.$\leq T_{melt} \leq$90° C., more particularly 40° C.$\leq T_{melt} \leq$60° C., where the thermoplastic component has functional groups which are able to react with isocyanate, and b) an isocyanate-containing component, which is present in dispersion in particulate form in the thermoplastic component and is substantially deactivated in the region of the particle surface, the particles having an onset temperature $T_{onset}$ of 40° C.$\leq T_{onset} \leq$100° C., more particularly 45° C.$\leq T_{onset} \leq$75° C., and $T_{onset}$ being $\geq T_{melt}$.

For the purposes of this description, $T_{melt}$ is the melting temperature of the thermoplastic component and $T_{onset}$ is the temperature at which the isocyanate groups of the particles in dispersion in the thermoplastic component are placed in a position to react with the functional groups of the thermoplastic polyurethane (for example, because they are distributed in the matrix with the thermoplastic polyurethane). In the case of blocked isocyanate groups, $T_{onset}$ is linked to the deblocking temperature; in the case of microencapsulation, it is linked with the release of isocyanate from the microcapsules (by melting of the microcapsule shell, for example); and, in the case of the isocyanates deactivated in the region of the surface of the isocyanate particles, it is linked with the melting of the isocyanate particles. For the purposes of this invention, all isocyanate-containing systems known in the prior art—blocked systems, microencapsulated systems, and isocyanate-containing systems deactivated in the region of the particle surface—are conceivable that meet the specifications for $T_{onset}$. The thermoplastic polyurethanes and the isocyanate-containing component are preferably dispersible in aqueous medium or in dispersion in aqueous medium.

Melting temperatures ($T_{melt}$) are determined by differential scanning calorimetry (DSC) according to DIN 53765-B-10 (1994).

$T_{onset}$ is likewise determined by differential scanning calorimetry (DSC). The signal evaluated here is the exothermic signal in the thermogram of the first heating curve at a heating rate of 10 k/min, corresponding to the reaction of the isocyanate groups. The onset temperature of this signal is used as $T_{onset}$.

If the heat-activatedly bondable adhesive is prefixed on the cover material by lamination, then any heat introduced for the preliminary fixing ought to be below the onset temperature $T_{onset}$ of the latent reactive layer of adhesive in such a way that the ultimate bonding—brought about by the reaction of the isocyanate with the functional groups of the thermoplastic component—does not as yet set in (become initiated).

The latent reactive adhesive films comprise in particular a thermoplastic component which has a melting temperature, $T_{melt}$, and comprises functional groups which are able to react with isocyanate, and also comprise an isocyanate-containing component, which is present in dispersion in particulate form, more particularly in finely dividedly particulate form, in the thermoplastic component, and is blocked, microencapsulated or substantially deactivated in the region of the particle surface. Finely dividedly particulate in this context means a particle size distribution with $d_{50}$<50 µm, the particle size distribution preferably being <15 µm. Latent reactive adhesive films are based preferably on what is called 1 K latent reactive polyurethane, obtained from aqueous polyurethane dispersion, preferably Dispercoll U® from Bayer AG; in that case the isocyanate-containing component is a component which is substantially deactivated in the region of the particle surface.

The particles have an onset temperature $T_{onset}$ for which $T_{melt} \leq T_{onset}$. $T_{melt}$ is between 35° C. and 90° C., preferably between 40° C. and 60° C. $T_{onset}$ is between 40° C. and 120° C., preferably not more than 100° C., very preferably not more than 90° C. As a lower limit, 50° C. is preferred and 60° C. particularly preferred.

The latent reactive adhesive films are non-tacky at room temperature, so that good (re-)positionability is ensured before thermal initiation takes place and the development of the strength of the adhesive bond is commenced.

With particular preference $T_{melt}$<$T_{onset}$, since in this way it is possible reliably to avoid unwanted triggering of the crosslinking reaction during the production of the latent reactive adhesive film in web form.

The thermoplastic component used preferably comprises compounds which have functionalization with OH and/or $NH_2$ groups. Very preferably the thermoplastic component is at least one semi-crystalline polyesterpolyurethane.

The latent reactive adhesive film here preferably comprises an anionic, high molecular mass polyurethane dispersion as thermoplastic component, which has a melting temperature (in dried form) $T_{melt}$ where 35° C.$\leq T_{melt} \leq$90° C., more particularly 40° C. $T_{melt} \leq$60° C., and comprises functional groups which are able to react with isocyanate, in the form, for example, of commercially available products from the abovementioned Dispercoll U family, such as Dispercoll U53, Dispercoll U54, Dispercoll U56, Dispercoll U 8755, Dispercoll U XP 2815, Dispercoll VP KA 8758, Dispercoll U XP 2682, Dispercoll U 2824 XP, Dispercoll U XP 2701, Dispercoll U XP 2702, Dispercoll U XP 2710 and/or Dispercoll BL XP 2578 (Dispercoll is a registered trademark of Bayer AG).

Moreover, the latent reactive adhesive film preferably comprises tolylene diisocyanate compounds (TDI compounds), such as Dispercoll BL XP 2514 (TDI dimer) and/or Aqualink U (dispersion of blocked TDI dimer) and/or isophorone diisocyanates (IPDI), such as Aqualink D (dispersion of blocked IPDI trimer) as isocyanate-containing component, which is present in dispersion in particulate form, especially finely dividedly particulate form, in the thermoplastic component and is blocked, microencapsulated or substantially deactivated in the region of the particle surface. The diisocyanates are used, for example, in the form of the aqueous suspensions of the particular latent reactive solid-state isocyanate. Aqualink is supplied by Aquaspersions.

Particularly in combination with anionic, high molecular mass polyurethane dispersions as thermoplastic component (such as the stated Dispercoll U products), the aforementioned diisocyanate products can be used as crosslinker component. Other isocyanates can be used, including monomeric and oligomeric compounds and also polyisocyanates.

The latent reactive adhesive film may further comprise other formulated constituents. These include thickeners, wetting agents, defoamers, fillers (e.g. thermally conducting fillers), pigments (including agents for colouring, for adjusting whiteness and/or for blackening), catalysts, stabilizers, ageing inhibitors, light stabilizers, and further polymers for establishing specific adhesive properties. Specific adhesive properties may be set, for example, by admixing aqueous dispersions of amorphous polymers (e.g. polyetherurethanes or polyacrylates) and/or admixing aqueous resin dispersions (especially those based on rosin esters) or liquid resins.

Preferred in accordance with the invention is the use of a latent reactive adhesive film with at least one layer of a latent reactive adhesive formulation, with a film thickness of between at least 10 µm and at most 500 µm, preferably between at least 20 µm and at most 250 µm.

Advantageous cover material suitably includes cover materials which can be pulled onto shaped articles, more particularly materials of this kind which can be stretched, examples being textiles, leather, synthetic leather, polymeric films and the like. Depending on the design of the shaped article, however, it is also possible for less stretchable materials to be stretched around shaped articles, such as metal foils, for example, or the like.

An advantageous procedure in accordance with the invention has the layer of the heat-activatedly bondable adhesive fixed on the cover material prior to contacting with the shaped article. This may take place, for example, by preliminary lamination of the heat-activatedly bondable adhesive on the cover material, and/or by introduction of a layer of a self-adhesive between the layer of the heat-activatedly bondable adhesive and the cover material. In this way a preliminary assembly is formed, composed of the cover material, optionally the self-adhesive and the layer of the heat-activatedly bondable adhesive, and this assembly can then be pulled onto the shaped article in the method of the invention.

A preliminary assembly of this kind can also be produced by using, in accordance with the invention, a prefabricated bonded assembly comprising at least one layer of a self-adhesive, which serves for preliminary fixing, and also a layer of a heat-activatedly bondable adhesive, which serves for final bonding. The two layers of adhesive—layer of self-adhesive and layer of the heat-activatedly bondable adhesive—are outer layers in such an assembly of adhesives, apart from any temporarily provided release materials that may be present.

The prefabricated bonded assembly used in accordance with the invention, or the assembly of self-adhesive and heat-activatedly bondable adhesive layer that comes about in the operation, may have further layers, provided in particular between the layer of self-adhesive and the layer of the heat-activatedly bondable adhesive, such as, for instance, carrier layers, stabilizing layers, release layers or the like. In particular it is possible, for example, for there to be a barrier layer provided which prevents the migration of substances between the two layers.

For the ease of handling of these bonded assemblies it is advantageous if they are provided prior to use, on one of their two adhesive layers—particularly on the layer of the self-adhesive—with a release material; both layers of adhesive may also be provided with a release material.

The layer of self-adhesive and the heat-activatedly bondable layer of adhesive may be present in each case—and independently of one another—over the full area or a partial area. Partial-area layers may be of coherent or non-coherent configuration, the latter for example in the form of a plurality of segments of adhesive provided independently of one another, such as, for instance, domes, stripes, dots or the like. A layer of adhesive in the sense of this specification is considered accordingly to be an adhesive whose individual parts lie substantially in one plane.

In one very advantageous version of the invention, the bonded assembly used in accordance with the invention—apart from any release materials that may be present temporarily—consists exclusively of a layer of a self-adhesive and of a layer of a heat-activatedly bondable adhesive.

As self-adhesive it is possible in principle to use the self-adhesives already known to the skilled person. Self-adhesives, referred to synonymously as pressure-sensitive adhesives (PSAs), are, in particular, polymeric compositions which—optionally by means of appropriate additization with further components, such as tackifying resins, for example—are durably tacky and permanently adhesive at the application temperature (at room temperature, unless otherwise defined) and attach to a multiplicity of surfaces on contact, more particularly attaching immediately (possessing what is called "tack" [stickiness or touch-stickiness]). At the application temperature, they are already capable of sufficiently wetting a substrate to be bonded, by means of solvent or by means of heat—but customarily by the influence of a greater or lesser pressure—in such a way that interactions sufficient for adhesion are able to develop between the composition and the substrate. Influencing parameters essential for this process include the pressure and also the contact time. The particular properties of the pressure-sensitive adhesives derive in particular from, among others, their viscoelastic properties.

Self-adhesives may in principle be produced on the basis of polymers of different chemical types. Examples of suitable base polymers for self-adhesives which can be used in accordance with the invention are acrylates, methacrylates, acrylate-methacrylate copolymers, natural rubbers, synthetic rubbers, acrylate block copolymers, styrene block copolymers, EVA, certain polyolefins, polyurethanes, polyvinyl ethers and silicones.

The pressure-sensitive adhesive properties are influenced by factors including the nature and the proportions of the monomers used in the polymerization of the polymers on which the pressure-sensitive adhesive is based, on their average molar mass and molar mass distribution, and also by the nature and amount of the additives to the pressure-sensitive adhesive, such as tackifying resins, plasticizers and the like.

For the purpose of achieving the viscoelastic properties, the monomers on which the polymers that form the basis for the pressure-sensitive adhesive are based, and also any further components of the pressure-sensitive adhesive that are optionally present, are selected in particular such that the pressure-sensitive adhesive has a glass transition temperature (according to DIN 53765) below the application temperature (that is, customarily, below room temperature).

By means of suitable cohesion-boosting measures, such as, for example, crosslinking reactions (formation of bridge-forming links between the macromolecules), it is possible to enlarge and/or shift the temperature range within which a polymer composition has pressure-sensitive adhesive properties. The application range of the pressure-sensitive adhesives can therefore be optimized by adjustment between fluidity and cohesion of the composition.

Strongly adhering self-adhesives are used advantageously, in order to ensure firm bonding on the cover material. Depending on the circumstance, however, it may also be advantageous to use relatively weakly adhering self-adhesives, particularly when repositioning of the cover material with the heat-activatedly bondable layer of adhesive by parting of the self-adhesive is intended in the course of the method of the invention.

The method of the invention can be employed advantageously wherever shaped articles are to be provided with a cover material, such as a covering, for instance, especially where the three-dimensional shaping of the shaped articles allows the cover material to be pulled onto the shaped article under tension. With particular advantage the method of the invention can be used, for example, in the production of furniture or in the vehicle and automotive sector.

In the automotive sector there are a series of conceivable applications realizable in accordance with the invention; in the interior of vehicles, for instance, a great many components are covered with leather or with synthetic leather, such as, for instance, linings (of doors, fittings and the like), gear levers and gear knobs, the centre console, steering wheels, headrests, to give just a few possible applications by way of example.

In one very advantageous configuration of the method of the invention, it is used to produce a vehicle steering wheel, by providing a shaped core article—made from polyurethane, for instance—having substantially the form of the steering wheel already, with a covering of a cover material—leather or synthetic leather, for instance. The cover material in this case is cut accurately to fit, before being fixed on the shaped article, and optionally is provided at selected locations with eyes, pre-bored holes for subsequent stitching or the like. The heat-activated adhesive layer is then fixed to the reverse of the blank covering piece, in particular by means of a self-adhesive and/or by preliminary lamination.

For the bonding of the cover material to the shaped article, the covering is stretched onto it with an accurate fit under tension. It may optionally be advantageous to preform the covering before applying it to the shaped article—for instance, to sew it to form a ring and then to pull this ring onto the shaped article. The absent or weak self-adhesiveness of the heat-activatedly bondable layer of adhesive allows the positioning of the bond partners to one another to be corrected as and when required.

As a result of the tension of the covering and its possible stretching, a pressure is exerted on the bond area and hence on the heat-activated layer of adhesive. For this purpose, the covering may be held in its stretched or extended position for a prolonged time, by means of appropriate mechanical arresting aids—temporarily attached clips, screw clamps, screws or the like—and/or the ends of the covering are permanently stitched to one another, bonded by quick-bonding adhesives additionally applied at the seam of the covering, such as instant adhesives, for instance, or stapled—in particular to the shaped article—or screwed, riveted or the like, it also being possible for the fixing methods to be combined with one another.

Moreover, thermal energy is supplied to a level sufficient to exceed the activation temperature of the heat-activatedly bondable adhesive and initiate the heat-activated bonding. As a result of the prevailing temperature and of the pressure exerted through the tension, there is durable and reliable bonding of the covering to the shaped article.

Through the use of the adhesively bonded assembly employed in accordance with the invention, an initially repositionable but ultimately durable and very reliable bond is produced which can be realized in a simple method, without the need for external pressure to be applied, but which guarantees a very clean bond. Hence by avoiding use of liquid adhesives—or using them very sparingly for the additional fixing at the seam of the covering; see above—it is possible to prevent adhesive being squeezed out from the seam and permanently soiling the product, or to prevent adhesive passing through the cover material and causing soiling, as is frequently the case when liquid adhesives are used with, for example, textile or porous materials.

The invention claimed is:

1. Method for bonding a sheetlike cover material to a shaped article, comprising:
   pulling a cover material onto a shaped article under tension so that a layer of heat-activatedly bondable adhesive contacts the shaped article;
   activating the layer of heat-activatedly bondable adhesive by means of pressure, said pressure resulting exclusively from the tension, and by means of heat introduced by an external energy supply,
wherein:
   the layer of heat-activatedly bondable adhesive adheres to the shaped article so that a connection between the cover material and the shaped article is produced; and
   an adhesive film is disposed between the cover material and the shaped article when the layer of heat-activatedly bondable adhesive has not yet adhered to the shaped article.

2. Method according to claim 1, wherein the layer of heat-activatedly bondable adhesive is fixed on the cover material prior to contact with the shaped article.

3. Method according to claim 1, wherein a layer of self-adhesive is disposed between the layer of heat-activatedly bondable adhesive and the cover material.

4. Method according to claim 1, wherein the cover material is a textile, a leather, a synthetic leather, or a polymeric film.

5. Method according to claim 1, wherein the cover material is additionally mechanically attached to the shaped article.

6. Method according to claim 1, wherein the shaped article is a core and the cover material is a covering of a vehicle steering wheel.

* * * * *